(12) United States Patent
Menier et al.

(10) Patent No.: US 12,501,012 B2
(45) Date of Patent: Dec. 16, 2025

(54) CORRECTION OF A HALO IN A DIGITAL IMAGE AND DEVICE FOR IMPLEMENTING SAID CORRECTION

(71) Applicant: 4D VIEW SOLUTIONS, Grenoble (FR)

(72) Inventors: Clément Menier, Grenoble (FR); Valentin Bonhomme, Saint Martin d'Heres (FR)

(73) Assignee: 4D VIEW SOLUTIONS, Grenoble (FR)

( * ) Notice: Subject to any disclaimer, the term of this patent is extended or adjusted under 35 U.S.C. 154(b) by 700 days.

(21) Appl. No.: 17/919,013

(22) PCT Filed: May 27, 2021

(86) PCT No.: PCT/FR2021/050965
§ 371 (c)(1),
(2) Date: Oct. 14, 2022

(87) PCT Pub. No.: WO2021/255361
PCT Pub. Date: Dec. 23, 2021

(65) Prior Publication Data
US 2023/0239448 A1 Jul. 27, 2023

(30) Foreign Application Priority Data
Jun. 16, 2020 (FR) ....................................... 2006252

(51) Int. Cl.
*H04N 13/122* (2018.01)
*G06T 15/50* (2011.01)
(Continued)

(52) U.S. Cl.
CPC ........... *H04N 13/122* (2018.05); *G06T 15/50* (2013.01); *G06T 19/20* (2013.01); *H04N 2013/405* (2018.05)

(58) Field of Classification Search
None
See application file for complete search history.

(56) References Cited

U.S. PATENT DOCUMENTS

2010/0150466 A1  6/2010 Koh
2017/0301145 A1  10/2017 Miller

FOREIGN PATENT DOCUMENTS

FR       3016028 B1    3/2018
JP    2016173785 A     9/2016
(Continued)

OTHER PUBLICATIONS

Talvala ("Veiling Glare in High Dynamic Range Imaging"). (Year: 2007).*

(Continued)

*Primary Examiner* — Chan S Park
*Assistant Examiner* — Elisa M Rice
(74) *Attorney, Agent, or Firm* — Falcon Rappaport & Berkman LLP

(57) ABSTRACT

A method for correcting a halo in a digital image captured using photogrammetry in a 3-D modeling studio, the halo being generated through the interaction of light originating from a light source in the studio with the optic of the shooting device, and manifesting as a local lightening of the digital image, the method comprising the steps of generating a light intensity map characterizing the light source in terms of spatial distribution and light intensity, providing a convolution kernel specific to the shooting device, calculating a convolution product of the light intensity map and the kernel to obtain a corrective value map, and removing the corrective value map from the digital image pixel by pixel to produce a corrected image in which the halo is not present.

9 Claims, 4 Drawing Sheets

(51) Int. Cl.
    *G06T 19/20*   (2011.01)
    *H04N 13/30*   (2018.01)

(56) References Cited

FOREIGN PATENT DOCUMENTS

| | | |
|---|---|---|
| WO | 2006129529 A1 | 12/2006 |
| WO | 2019/166743 A1 | 9/2019 |

OTHER PUBLICATIONS

Chow et al. (Removal of Specular Reflection Component Using Multi-view Images and 3D Object Model). (Year: 2009).*

Perrin et al. ("The Structure of High Strehl Ratio Point-Spread Functions"). (Year: 2003).*

Office Action, Japanese Patent App. 2022-577282, Jan. 24, 2025.

International Search Report issued in corresponding international patent application No. PCT/FR2021/050965 dated Oct. 11, 2021; four pages.

French Search Report issued in corresponding French patent application No. FR2006252 dated Feb. 12, 2021; six pages.

Naimuddin SHAIKH, et al.; "Scatter-glare correction using a convolution algorithm with variable weighting"; Medical Physics, AIP; vol. 14, No. 3; May 1, 1987; pp. 330-334 and Figure 1.

Mandakinee SINGH, et al.; "Detection of glare in night photography"; 2016 23rd International Conference on Pattern Recognition; IEEE, Dec. 4, 2016; pp. 865-870.

M. Dellepiane, et al.; "Improved color acquisition and mapping on 3D models via flash-based photography"; Journal on Computing and Cultural Heritage; vol. 2, No. 4; Mar. 3, 2010; pp. 1-20; specifically p. 9 through page12.

Citalli Gamez SERNA, et al.; "Data Fusion of Objects Using Techniques Such as Laser Scanning, Structured Light and Photogrammetry for Cultural Heritage Applications"; Advances in Databases and Information Systems Lecture Notes In Computer Science; Feb. 21, 2015; pp. 208-224; specifically, p. 211 and Figure 1.

* cited by examiner

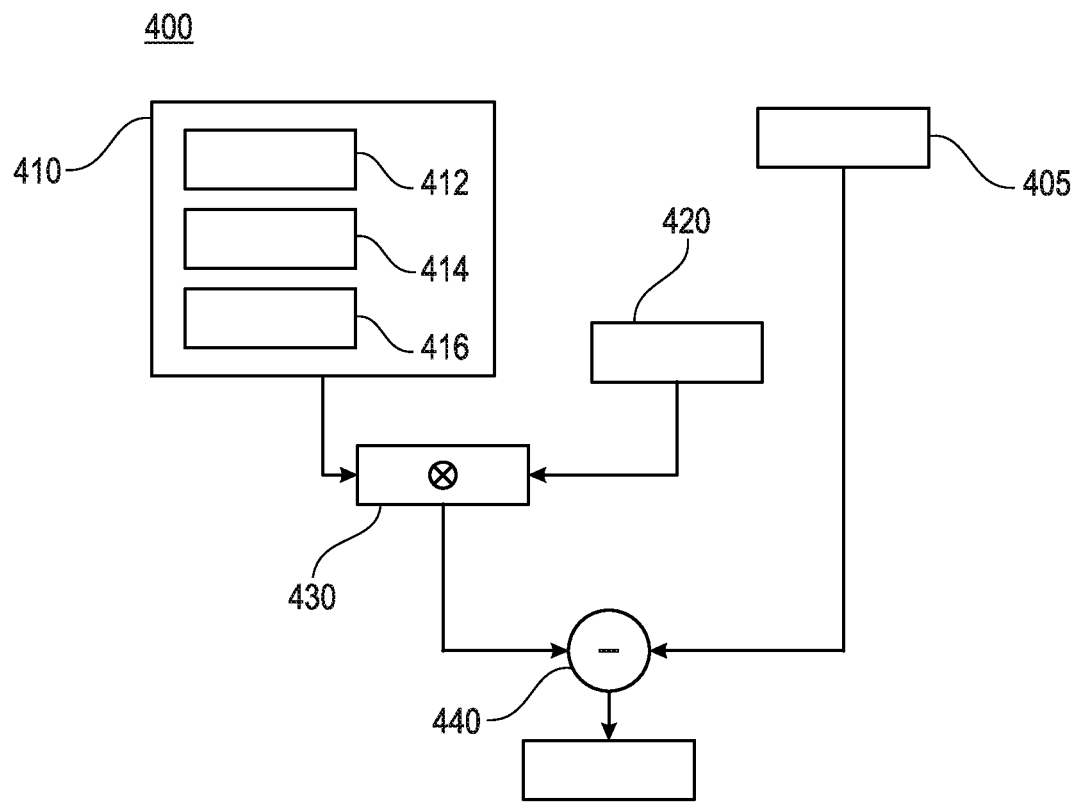
Fig. 4
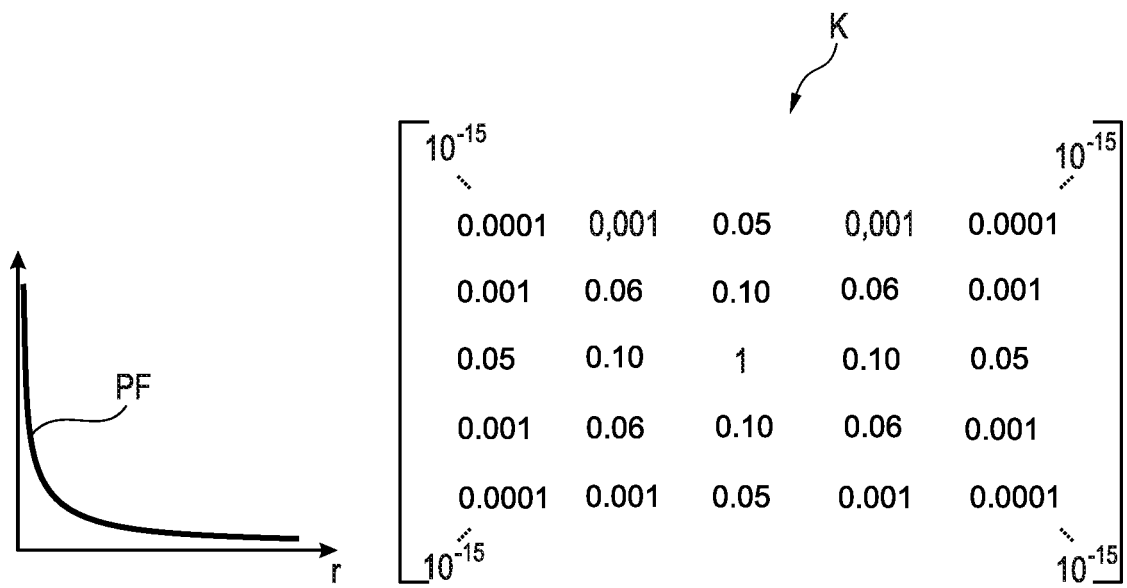
Fig. 5
Fig. 6

CORRECTION OF A HALO IN A DIGITAL IMAGE AND DEVICE FOR IMPLEMENTING SAID CORRECTION

CROSS REFERENCE TO RELATED APPLICATIONS

This application is the U.S. National Stage of PCT/FR2021/050965 filed on May 27, 2021, which application claims priority under 35 USC § 119 to French Patent Application No. 2006252 filed on Jun. 16, 2020. Both of these applications are hereby incorporated by reference in their entirety.

TECHNICAL FIELD

The invention relates to a method for correcting a halo appearing in a digital image captured during photo or video shooting and an image capture device intended to implement said halo correction method.

The invention relates more particularly to a method intended to correct the halo effect created by light sources in view of a shooting device and reducing the quality of an image captured by this device by inhomogeneous modification of its brightness.

PRIOR ART

In order to take shots of a scene in good light conditions, artificial lighting systems are conventionally used to illuminate this scene.

Due to the intensity of the light produced by these lighting systems and the interaction of these lights with the shooting devices, artifacts may be generated in the images captured by these devices, manifesting as diffuse or localized lightenings negatively impacting their quality, in particular by lowering their contrast and by generating inhomogeneous modifications of their brightness such as whitening, flare factors or diffraction figures.

In the case of conventional shots with, for example, a single camera used as the shooting device, the light sources are generally placed outside the field of the camera so as to avoid generating such artifacts, for artistic purposes.

Furthermore, visual corrections such as contrast enhancements are routinely implemented, also for artistic purposes, i.e. according to subjective criteria.

In the case of a three-dimensional scene modeling studio by multi-view photogrammetry as described in patent documents FR3016028 B1 and WO2019/166743 A1, the light sources and the cameras are distributed around a scene to be modeled, and it is generally impossible to avoid the presence of light sources in the fields of the cameras, leading to the above-mentioned problems of degradation of the quality of the images captured by these cameras.

The three-dimensional scene modeling, based on a three-dimensional analysis of the images, is therefore also negatively impacted by the above-mentioned artifacts.

SUMMARY OF THE INVENTION

One objective of the invention is to correct the artifacts caused by the light sources used during a shot, all of these artifacts being designated by the term "halo," so as to render the digital images captured by a shooting device much as they would have been without the brightness distortions caused by the halo.

To this end, the object of the invention is a method for correcting a halo in a digital image to be corrected of a scene captured in a three-dimensional modeling studio using photogrammetry by means of a shooting device having a shooting field of the scene, this halo being generated through the interaction of light emitted by a light source with the optic of the shooting device, and manifesting as a lightening of pixels of the digital image to be corrected, said light source forming part of a lighting system of the scene, the method comprising the steps of generating a digital light intensity map characterizing said light source in terms of spatial distribution relative to the shooting field and in terms of light intensity as it is perceived from the shooting device during the capture of the image to be corrected, this map forming a first data matrix, providing a convolution kernel specific to said shooting device, forming a second data matrix, calculating a convolution product of the first matrix and the second matrix to obtain a third data matrix corresponding to a corrective value map of the halo in the digital image to be corrected, and removing the corrective value map from the digital image to be corrected pixel by pixel to obtain a corrected image in which the halo is not present.

A first advantage of the invention is the correction of a halo inhomogeneously modifying the brightness of an image captured by a shooting device, this halo manifesting by one or more local lightenings or whitenings in the image when it is not corrected.

The method according to the invention thus very significantly improves the contrast and the reproduction of the colors and the light intensity levels not only within the same image, but also, in the case of a studio comprising several shooting devices, between images captured by these different devices.

In addition, in the case of three-dimensional modeling of a scene by multi-view photogrammetry, the modeling is based, inter alia, on the color identity of a given element of a scene to identify it and track its movement from images captured by multiple shooting devices.

The better appreciation of the colors in the images processed by the method according to the invention therefore allows better three-dimensional modeling of a scene.

The method according to the invention may have the following specific features:
 the step of generating the digital light intensity map may comprise the steps of generating a preliminary digital light intensity map characterizing said light source in terms of spatial distribution relative to the shooting field and in terms of light intensity as it is perceived from the shooting device when said light source is fully visible to the shooting device, and generating said digital light intensity map from the preliminary digital map and the digital image to be corrected, by determining pixels belonging to said light source in the preliminary digital map that are hidden from the shooting device in the digital image to be corrected;
 the convolution kernel may be a matrix generated from a sum of a one-dimensional function having a constantly decreasing envelope and representative of contributions from kernel scattering phenomena and a two-dimensional function and representative of contributions from a kernel diffraction figure;
 the convolution kernel can be a matrix generated from a constantly decreasing isotropic function;
 the convolution kernel can be generated by the steps of acquiring a first and a second digital training image by means of the shooting device, these two images respectively comprising a training light source that is switched off and said training light source that is switched on, generating a training light intensity map of the training source from the first digital training image by assigning a light intensity value to the pixels of this second digital image comprised in the light source, and calculating the kernel from the two digital training images and the light intensity map.

The invention extends to an image capture device for a three-dimensional modeling studio, comprising a plurality of shooting devices functionally connected to a data processing unit, in which said data processing unit is specially adapted to implement the method for correcting a halo according to the invention.

BRIEF DESCRIPTION OF THE DRAWINGS

The present invention will be better understood and other advantages will appear on reading the detailed description of the non-limiting embodiment taken by way of example and illustrated by the appended drawings, which are briefly described below.

FIG. 4 is a diagram of the method for correcting a halo in an image.

FIG. 5 illustrates a function for generating a convolution kernel for correcting a halo.

FIG. 6 illustrates a convolution kernel in the form of a matrix.

DESCRIPTION OF AN EMBODIMENT OF THE DEVICE ACCORDING TO THE INVENTION

This embodiment is described by FIGS. 1 to 10 and relates to the application of the invention to a three-dimensional scene modeling studio by multi-view photogrammetry.

The studio comprises cameras C1 to C8 used as shooting devices, arranged around an area A where scenes to be modeled from digital images captured by these cameras are placed.

The studio further comprises light sources L1 to L8 also regularly arranged around the area A.

The field V of the camera C1 encompasses the light sources L4 and L5, which, due to their high light intensity and their interactions with the optical elements of the camera C1 (lenses, possibly diaphragm), are sources of artifacts in the captured images, considered collectively as a halo inhomogeneously lightening an image captured by the camera C1.

This embodiment consists in correcting a digital image of a scene captured by the camera C1.

Image Correction

The method for correcting an image according to the invention, illustrated by the diagram 400 of FIG. 4, consists in modeling the halo generated by the light sources in an image to be corrected captured by the camera C1, then in removing it from this image so as to obtain a corrected image freed from the halo.

For the sake of simplification, here we consider the case of an image in grayscale, considering that the method applies in the same way to color images, simply by processing the different color channels in parallel, such as a red channel, a green channel and a blue channel.

Figure 1:
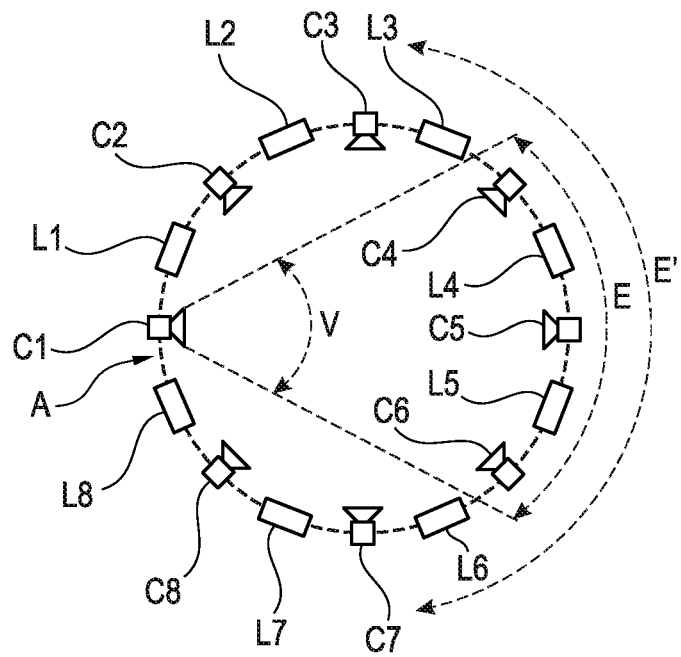
FIG. 1 illustrates a horizontal sectional view of a three-dimensional scene modeling studio by multi-view photogrammetry.
Figure 2:
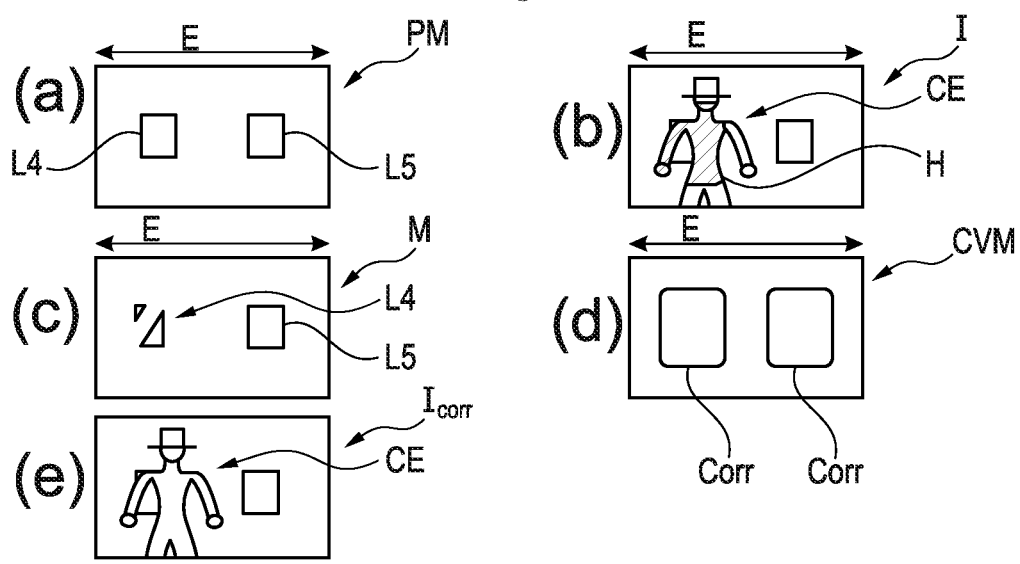
FIG. 2 illustrates a method of establishing a light intensity map.

Step 405 consists in capturing a digital image I to be corrected by means of the camera C1 and storing it in computer memory, the halo H lightening a certain region of the image, as illustrated by the crosshatched region of FIG. 2, diagram (b).

Step 410 consists in generating a digital light intensity map M indicating spatial distributions and intensities of the light sources located in view of the camera C1.

In a first example of this embodiment, only the halo generated by the light-emitting surfaces of the light sources directly visible by the camera C1, L4 and L5 is corrected.

Each visible light source of the camera can be considered a set of elementary light sources each visible in the image to be corrected in the form of a saturated pixel.

"Saturated pixel" means a pixel displaying a level of brightness at the maximum value, 255 in the case of a luminosity coded on 8 bits in a digital image.

Diagram (c) of FIG. 2 illustrates the light sources L4 and L5 located in the field V of the camera C1 as seen by the camera C1 during the capture of the image to be corrected, pixel by pixel, the source L4 being partially hidden from the camera C1 by the character CE of the scene shown in diagram (b).

This diagram (c) here corresponds exactly to an image of the field V of the camera C1 according to a horizontal extent E corresponding to the horizontal extent E of the field of the camera C1.

Step 410 can then comprise sub-steps 412, 414 and 416.

Sub-step 412 consists in generating a digital light intensity map of the empty studio, that is to say, with the light sources entirely visible from the camera C1, by determining the saturated pixels of an image of the empty studio with the light sources L4 and L5 switched on, then assigning these pixels the light intensity of the light sources, so as to arrive at a preliminary digital light intensity map PM.

Diagram (a) of FIG. 2 illustrates the preliminary map PM, corresponding to an image of the field V of extent E of the camera C1 comprising only the light sources L4 and L5 as seen by the camera C1, these sources here being rectangular illuminated surfaces.

This light intensity map is a first matrix of pixels that correspond in terms of position to the pixels of the digital image I to be corrected, the brightness value of the light sources being assigned to the pixels of the map belonging to a light-emitting surface seen by the camera C1, the other pixels having an essentially zero value.

The light intensity here relates to the maximum brightness achievable by a saturated pixel in the image to be corrected.

On an arbitrary basis of luminosity consisting in assigning 1 as the light intensity value that is just sufficient to saturate a pixel of an image to be corrected, the brightness of the light sources can reach several thousands, 10,000 for example, and can be measured by conventional means.

For example, by adjusting the light sensitivity range of the camera C1, said camera can directly measure the light intensity of the light sources pixel by pixel while avoiding saturating the pixels, and thus generate the light intensity map PM, which constitutes a reference digital image of the shooting device's field.

By proceeding in this manner, only the light sources located in the field V of the camera C1 are taken into account, which are also the light sources generally degrading the image to be corrected the most.

It is also possible to manually enter the positions and intensities of the light sources in a computer file in order to generate a light intensity map of the empty studio.

Sub-step 414 consists in identifying, by conventional image processing means, the pixels of the map PM belonging to a light source that are found as unsaturated pixels in the image to be corrected I, illustrated by FIG. 2, diagram (b).

This step makes it possible to identify the pixels of the illuminated surfaces of the preliminary map PM that are hidden from the camera C1 by an element of a scene, such as the character CE of FIG. 2, diagram (b).

Sub-step 416 consists in assigning an essentially zero value to the pixels identified in step 414 so as to obtain the light intensity map M illustrated by FIG. 2, diagram (c), representative of the light sources directly seen by the camera C1 during the acquisition of the image I to be corrected, indicating their respective positions and light intensities in the field of the camera.

The light sources can have spatially inhomogeneous intensities in the light intensity map M, for example to reflect a situation of a source consisting of a panel of very bright light-emitting diodes placed behind a diffuser panel only imperfectly diffusing the light from the diodes, letting them appear in the form of small localized surfaces having light intensities stronger than their surroundings.

Step 420 of diagram 400 consists in providing a convolution kernel K adapted to the camera C1 this kernel can be considered a halo generation kernel specific to the camera C1, this kernel forming a second data matrix.

This kernel is a matrix translating the influence of a point of a light source on the brightness of each point of the image captured by the digital image sensor of the camera and which is to be corrected.

The camera is characterized by its optical system (lenses, diaphragm) and its sensor, formed by a matrix of photosensitive pixels.

The kernel can be defined as a matrix in which each element translates the influence of a pixel of a digital light intensity map on the pixels of a digital image to be corrected, as explained below.

It is recalled that a digital image is a data matrix, each data item expressing a light intensity of the corresponding pixel of the image.

The halo is primarily noticeable only when the light source is strong relative to the light intensity level of the scene from which an image is being captured, which is the case with studio light sources.

Furthermore, each pixel of the light intensity map belonging to a light source can be considered an elementary light source generating its own halo.

However, the overall halo of the image to be corrected results from an additive phenomenon, the effects of each light source or each region of a light source being added to those of the other light sources or regions of light sources.

Thus, the halo of the digital image to be corrected is the addition of all the halos specific to each of the pixels of the digital map M, and can be calculated by the convolution, or convolution product, of the light intensity map and a convolution kernel K modeling the effects of an elementary light source on the capture of an image by the camera.

For this reason, even if the halo generated by an elementary surface of a light source remains localized and barely perceptible, the halo generated by the light sources considered as a whole has a much greater impact and range, which must be taken into account by the kernel.

The inventors thus have the experience of light sources located in an image to be corrected generating a significant halo phenomenon over a radius equivalent to a quarter of the width of the image, so that in such a situation the kernel will have to be twice the normal size, therefore equivalent to half the size in pixels of the image.

For the case of a square kernel and an image 2,000 pixels wide, the kernel could thus correspond to a two-dimensional matrix of 1,000×1,000 elements, the effects of the halo extending over a radius of 500 pixels from a considered light source, such as a pixel of an image of an illuminated surface of an artificial lighting system.

The halo whose effects one seeks to correct is generated by the interaction of one or more light sources with the optics of the camera capturing the images to be corrected, in particular the lenses and the diaphragm, and is therefore specific to the optical system of the camera used.

We can consider the simple, but broadly applicable, case of an isotropic halo generated by the multiple scattering of the light received by the lenses of the camera optic, resulting in an inhomogeneous lightening of the image captured by the latter.

The effect of the isotropic halo on a pixel of the image decreases rapidly with the apparent distance of this pixel from a given pixel of a light source and depends solely on this distance, since here we are limiting ourselves to an isotropic effect.

It is possible to empirically determine an adequate kernel to correct the image affected by this isotropic halo based on an isotropic parametric function, first rapidly decreasing then tending asymptotically toward 0, which translates the local, isotropic and rapidly decreasing influence of a pixel from a light source on an image to be corrected.

FIG. 5 generically shows such a parametric function PF defined using parameters and varying as a function of a radius r that represents, in the case of our kernel, the distance from the considered light source.

FIG. 6 illustrates a convolution kernel K, i.e. a matrix modeling the effect of a light source on the image for a particular camera, derived from the function of FIG. 5 by spatial digitization on a number of points corresponding to a distance from the sensor of the camera C1 on which the halo has a perceptible influence (1,000 points in the example above).

The elements of this matrix are defined so as to have values varying with their distance from the center of the matrix according to the parametric function PF, each datum of the matrix corresponding to a pixel and being considered to be distant from its nearest neighbors by a distance equal to the pixel pitch of the camera sensor.

The kernel K of FIG. 6 illustrates this construction, with data of values decreasing with their respective distances with respect to the center of the matrix according to the decreasing parametric function PF.

For illustration, the central datum of the kernel here has a value of 1 and the data furthest from the center have a value of $10^{-15}$, but this of course only represents a particular case taken as an example.

By applying this kernel to the image correction as described below, then manually adjusting the parameters of the parametric function PF in view of the results of the correction to adapt it to the shooting system used and to improve the correction, the kernel is modified by successive iterations until a satisfactory level of correction is obtained.

Due to the particular situation represented by each shooting system, it is not possible to define one or more precise parametric functions that are applicable to all systems, such that the adjustment phase described above is essential unless the kernel training method described below is applied.

Each practitioner may choose one or more types of parametric functions, depending on the type of camera he uses and his personal experience and preferences in terms of calculation.

Step 430 of the image correction method consists in calculating a corrective value map CVM illustrated by the image of diagram (d) of FIG. 2, each pixel of which corresponds to a pixel of the image to be corrected, by obtaining the convolution product of the light intensity map M and of the convolution kernel K, this map forming a third data matrix.

The map CVM comprises correction regions Corr with non-zero values corresponding to the halo generated by the light sources of the light power map M, the pixels of the other regions of the map CVM having zero, non-corrective values.

Step 440 of the method consists in calculating a corrected image Icorr illustrated by the diagram (e) of FIG. 2, by removing the corrective value map CVM from the image I to be corrected, pixel by pixel, to obtain a corrected image in which the halo is not present.

It is understood that the expression "to obtain a corrected image in which the halo is not present" expresses an ideal objective that cannot in practice be completely achieved, that is to say, complete elimination of the halo is the objective, but the implementation and the advantages of the method do not require perfect elimination of the halo from the image to be corrected.

In this document, removing a first image from a second image amounts to removing, for each pixel, the brightness values of the first image from the respective brightness values of the second image.

Finally, step 450 consists in recording the corrected image calculated in step 440 in computer memory.

Figure 3:
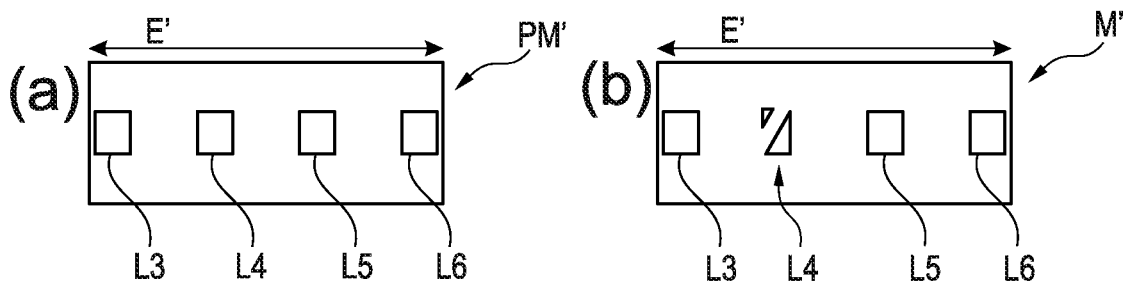
FIG. 3 illustrates a variant of the method shown in FIG. 2.

FIG. 3 shows a variant in the establishment of a light intensity map M', differing from the method of FIG. 2 in that the light intensity map is an image of arbitrary size of extent E' preferably covering a wider field than that of the camera C1 so as to encompass the latter.

It is for example possible to manually enter the positions of the light sources included in this extent E with respect to the field of view of the camera C1, to insert them into an image having a surface in pixels encompassing the image to be corrected, then assign to these positions light intensities measured in a conventional manner in order to obtain the preliminary light intensity map PM' illustrated by diagram (a) of FIG. 3.

For reasons of convenience for the calculations, each pixel of the image I to be corrected preferably corresponds exactly to one pixel of the preliminary map PM'.

From a practical point of view, the map PM' can also be obtained by changing the orientation of the camera C1 to capture views of the entire extent E' with an adequate range of light sensitivity, then by combining these views in a conventional manner to form the preliminary map PM'.

It is then possible, by implementing sub-steps 414 and 416, to establish a light intensity map M', illustrated by FIG. 3, diagram (b), adapted to the correction of the image to be corrected I of FIG. 2, diagram (b).

This map, of extent E' greater than extent E, takes into account not only the light sources L4 and L5 located in the field of the camera C1, but also the light sources L3 and L6 located outside the field V of the camera C1 and therefore not visible in the image I to be corrected, but liable to contribute significantly to the halo degrading the quality of the latter.

By using this light intensity map in the correction method 400, it is possible to correct a halo generated not only by the light sources comprised in the image to be corrected, but also by light sources located outside the image to be corrected, thus improving the quality of the correction.

Kernel—Training Method

The image correction procedure described above can use a convolution kernel obtained empirically as explained previously, or else a kernel obtained by calculation by means of a training procedure.

We will outline two possible training procedures, each making it possible to calculate a convolution kernel for generating a halo for a given shooting device, by means of two training images captured by this shooting device and respectively representing a light source that is switched on and the same light source switched off.

These procedures are based on the principles according to which one of these two images makes it possible to determine a light intensity map as defined above and the difference between these images makes it possible to determine the halo created by the light source interacting with the considered shooting device.

From these data, and knowing how the halo is generated from the light power map and the desired convolution kernel, it is possible to use conventional calculation methods to find this kernel.

Figure 7:
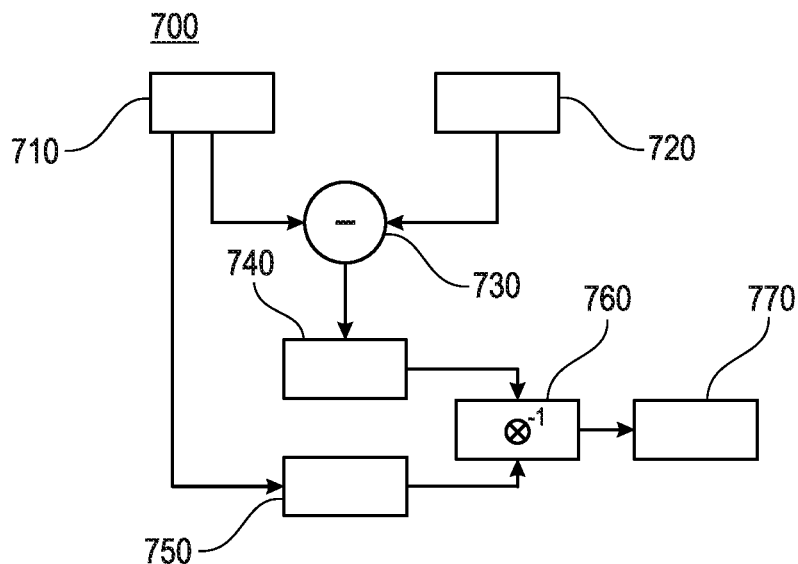
FIG. 7 is a diagram of a method for determining a convolution kernel.
Figure 8:
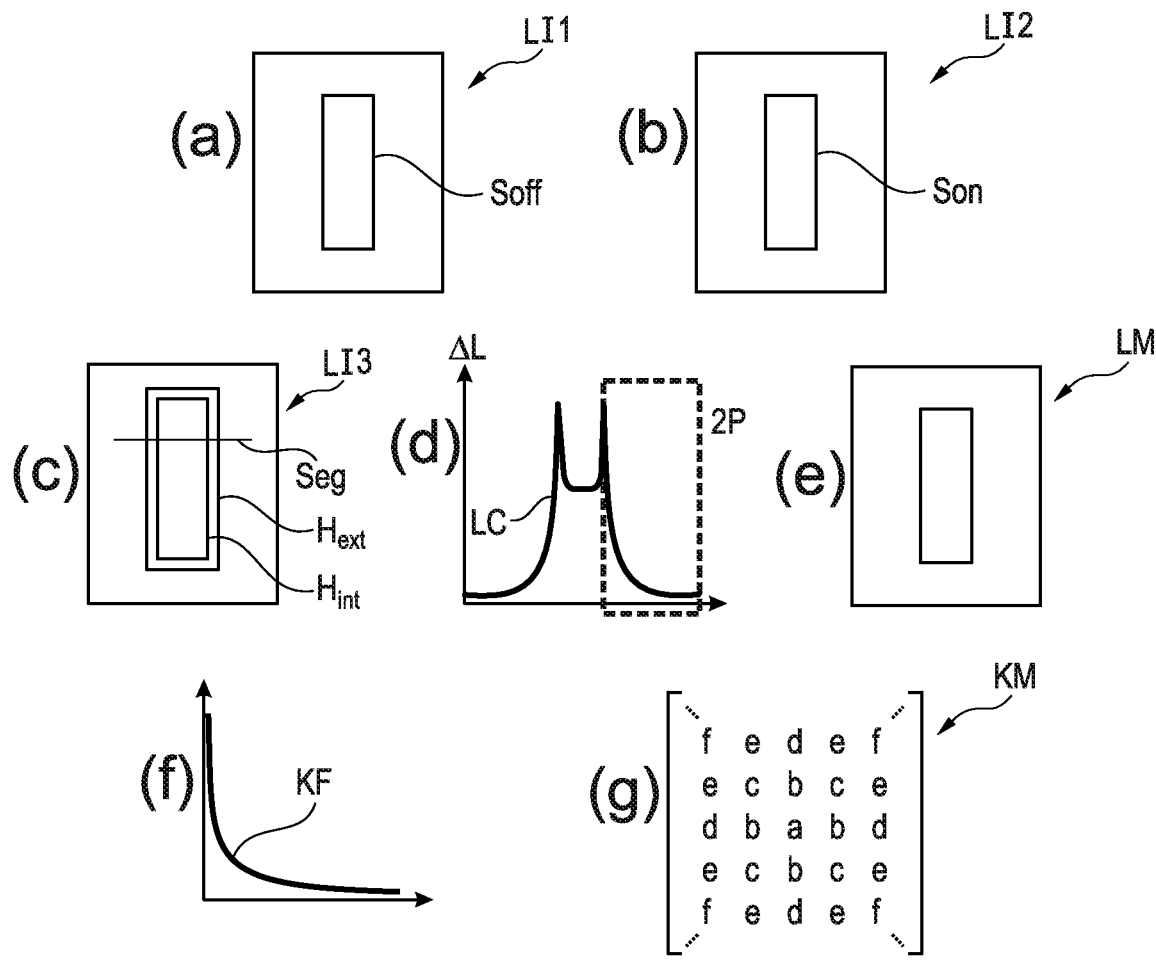
FIG. 8 illustrates the method of FIG. 7.

A first training procedure is illustrated by the diagram 700 of FIG. 7 and the diagrams (a) to (f) of FIG. 8 and implements a deconvolution.

Step 710 consists in capturing a first training digital image LI1 encompassing a switched off light source Soff, identified by Soff in FIG. 8, diagram (a), using the shooting system for which one wishes to calculate a halo generation kernel.

It may be the shooting device used to capture an image to be corrected, or another device of the same model equipped with the same optic.

Step 720 consists in capturing a second training digital image LI2 encompassing the same light source, but switched on this time, under the same conditions as the image captured when it was switched off, identified by Son in FIG. 8, diagram (b).

It should be noted that, due to the halo caused by the light from the light source, the area that it occupies will appear larger in the images captured when it is switched on than when it is switched off.

Step 730 consists in removing the first image LI1 from the second image LI2, which makes it possible to obtain a third digital image LI3 comprising portions representing the halo generated by the interaction of the light source with the shooting device.

In diagram (c) of FIG. 8, the regions Hint and Hext respectively represent halo regions located inside and outside the switched off light source of diagram (a) of FIG. 8.

Step 740 consists in extracting a curve LC from the third image LI3, this curve LC representing the difference in brightness ΔL between the images LI1 and LI2 along a segment Seg crossing the light source, as illustrated by FIG. 8, diagram (d).

It is then considered that a portion P of the curve LC corresponding to an outer periphery of the light source, crossing the region Hext and including a maximum of the curve LC, is representative of the halo and makes it possible to find the kernel.

Conversely, the region Hint is not considered to provide information that is usable in practice to determine the kernel.

Step 750 consists in generating a light intensity training map LM, illustrated by FIG. 8, diagram (e), for example from the first image LI1 by assigning the pixels considered to be part of the light source a light intensity value of the source measured in a conventional manner.

For example, a pixel can be considered part of the light source when it exceeds a given light intensity level, this given light intensity level being chosen by an operator so as to distinguish the switched off light source from the background of the image LI1.

The training light intensity map LM could also be obtained manually as described above for obtaining the preliminary light intensity map PM.

From the portion P of the curve LC and the training light intensity map LM, it is possible to determine a kernel generation function KF, then the desired convolution kernel KM itself in the form of a matrix, which will be used subsequently in the image correction method outlined above.

More specifically, considering that the function represented by the curve LC in the region P is the result of the convolution of the training light intensity map LM and of the kernel that it is sought to obtain, a deconvolution operation 760 of the curve LC by the map LM makes it possible to determine a kernel generation function KF, deconvolution done by means of a digital data processing unit such as a computer processor.

Finally, step 770 for spatial digitization of the function KF on a number of points corresponding to a distance in pixels from the sensor of the shooting device on which the halo has a perceptible influence makes it possible to determine the kernel, that is to say, the elements of the matrix KM.

The elements of the matrix KM are defined from the function KF as the kernel K in FIG. 6 as derived from the function PF in FIG. 5, so as to obtain the matrix KM in FIG. 8, diagram (g), with data having values b to f decreasing in this order with their respective distances with respect to the center of the matrix occupied by the element a, according to the decreasing function KF.

Figure 9:
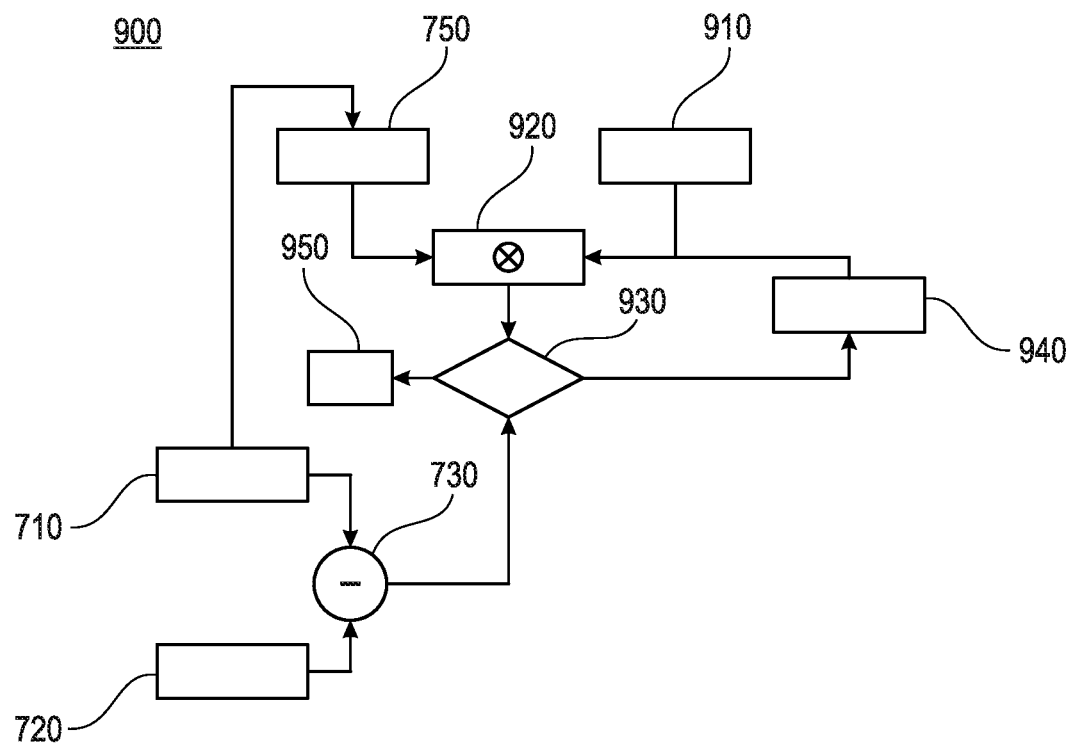
FIG. 9 is a diagram of a method for determining a convolution kernel different from that of FIG. 7.

A second training procedure is illustrated by the diagram 900 of FIG. 9 and makes it possible to approximate a kernel generation function by conventional mathematical methods of approximations by regression such as approximations by polynomial regression.

For the steps of the diagram 900 having the same identifiers as the steps of the diagram 700, reference can be made to the preceding explanations.

It is considered that the image LI3 obtained from step 730 corresponds to the halo generated by the switched on light source Son.

However, this halo is modeled by the convolution product of the convolution kernel sought and of the light intensity map LM obtained at the end of step 750.

It is therefore understood that it is possible to find the convolution kernel sought by successive approximations of the kernel aimed at causing the result of the convolution product and the image LI3 to converge.

Concretely, it is possible to provide an initial kernel in step 910, to obtain its convolution product with the light intensity map LM during step 920, then to compare the obtained convolution product with the image LI3 during a test step 930.

If, according to criteria chosen by the practitioner, it is determined during the test step that the image LI3 resulting from step 730 and the result of the convolution product from step 920 are too far apart, a new kernel is calculated by means of a data processing unit according to conventional regression methods during step 940, which is reinjected into the convolution product in place of the kernel of step 910, then steps 920 to 940 are repeated in a loop, until the test step 930 indicates sufficient convergence of the convolution product toward the image LI3.

Once sufficient convergence has been obtained, during step 950 the last calculated kernel is recorded in a computer memory as the desired convolution kernel, similar to the kernel KM obtained by the method illustrated by the diagram 700 and FIGS. 7 and 8.

The examples above are limited to cases of isotropic halos generated by a kernel that is in turn isotropic, the kernel being calculated by means of a one-dimensional function representing the light intensity variations only in one direction, the radial direction, and which is sufficient to characterize the isotropic contributions to the halo.

Such an isotropic kernel is generally sufficient, since one may often neglect, for example, the diffraction effects of the diaphragm, which are effectively negligible for a diaphragm using a large aperture.

In the case of non-negligible diffraction from the diaphragm, one may add to a one-dimensional function, representing the isotropic contributions to the kernel, a two-dimensional function having a symmetry on the same order as the diaphragm to represent the contributions of its diffraction to the kernel, then proceed in the same way as before for an empirical determination or a determination by training the kernel.

This principle applies to any type of optical effect participating in halo generation in an image to be corrected.

In general, the convolution kernel can be generated from a sum of a one-dimensional function having a constantly decreasing envelope representative of isotropic contributions to the kernel and of a two-dimensional function representative of anisotropic contributions to the kernel.

The isotropic contributions to the kernel may in particular come from scattering phenomena by the lenses of the considered shooting device.

The anisotropic contributions to the kernel may in particular come from diffraction phenomena, visualized for example in the form of diffraction figures in an image to be corrected.

In such a case, the two-dimensional function may correspond to a function representative of a diffraction figure and having the same order of symmetry as this figure, or may correspond to a sum of such functions.

Figure 10:
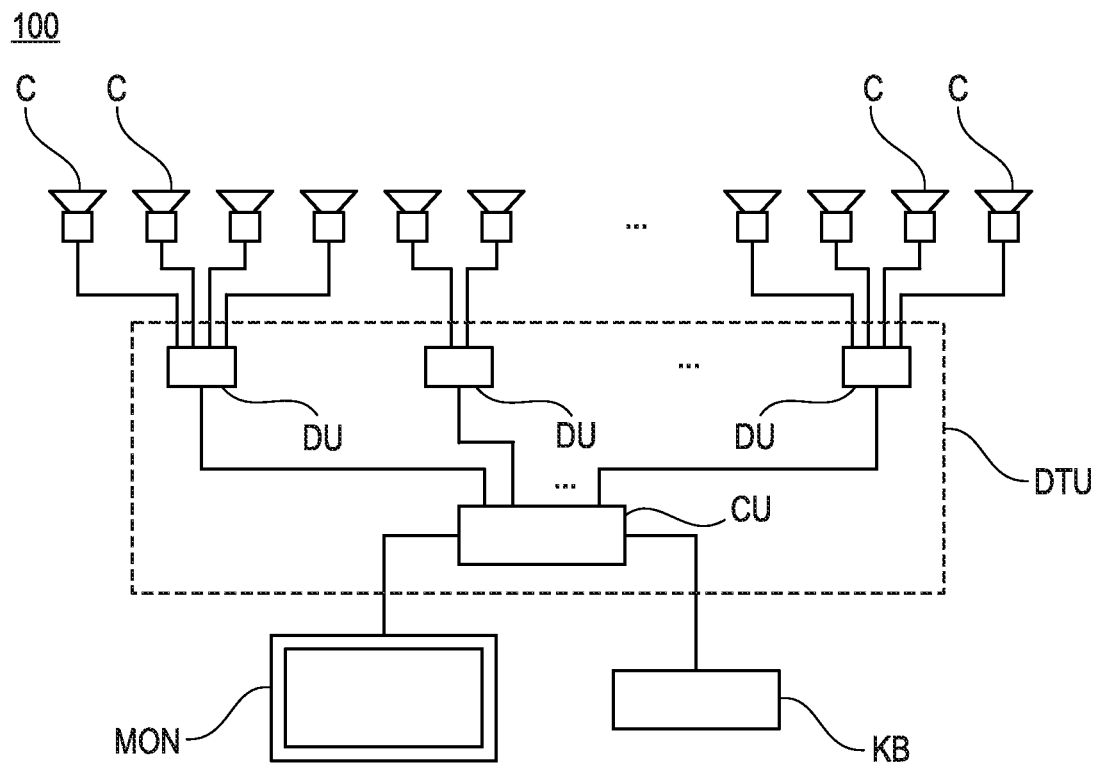
FIG. 10 illustrates a device for implementing the methods of the diagrams of FIGS. 4, 7 and 9.

FIG. 10 illustrates an image capture device 100 for a three-dimensional modeling studio that is adapted to implement the halo correction method according to the invention.

This device comprises a plurality of cameras C used as shooting devices, each connected to a digital data processing unit DTU comprising a data centralization and calculation unit CU and decentralized units DU forming the interface between the data centralization unit CU and each of the cameras C.

A control monitor MON connected to the centralization unit makes it possible to view the images captured by the system and a digital data entry unit KB such as a numeric keyboard makes it possible to enter orders in the data processing unit.

The monitor MON and the unit KB can be used, for example, to refine the kernel employed by the halo correction method in the case of empirical determination of the kernel by visual estimation, by an operator, of the quality of the halo correction in the images and manual modification of the parameters of the kernel generation function by this operator.

In this example, each of the decentralized units DU comprises a memory in which the convolution kernel adapted to the model of the cameras of the device are stored.

Light intensity maps are also stored in these decentralized units, each specific to a camera, associated with the configuration of the modeling studio in which the device is integrated and depending on the arrangement of the concerned cameras and the lighting systems.

These decentralized units are arranged to process the images captured by means of the halo correction method according to the invention, using the light intensity maps and the kernel stored in memory.

Of course, this system can also be adapted to the implementation of a training procedure of the convolution kernel.

It should be noted that the images mentioned in this description may or may not have undergone digital processing intended, for example, to improve their contrast or sharpness, and may each be understood as a single digital image captured at a given instant, or as an average of several digital images captured at different instants.

It goes without saying that the present invention is not restricted to the embodiment described above, and may be modified without departing from the scope of the invention.

What is claimed is:

1. A method for correcting a halo in a digital image to be corrected of a scene captured in a three-dimensional modeling studio using photogrammetry by means of a shooting device having a shooting field of the scene, this halo being generated through an interaction of light emitted by a light source with an optic of the shooting device, and manifesting as a lightening of pixels of the digital image to be corrected, said light source forming part of a lighting system of the scene, comprising:
   generating a digital light intensity map characterizing said light source in terms of spatial distribution relative to the shooting field and in terms of light intensity as it is perceived from the shooting device during the capture of the image to be corrected, this map forming a first data matrix;
   providing a convolution kernel specific to said shooting device, forming a second data matrix;
   calculating a convolution product of the first data matrix and the second data matrix to obtain a third data matrix corresponding to a corrective value map of the halo in the digital image to be corrected; and
   removing the corrective value map from the digital image to be corrected pixel by pixel to obtain a corrected image in which the halo is not present;
   wherein the step of generating the digital light intensity map comprises:
   generating a preliminary digital light intensity map characterizing said light source in terms of spatial distribution relative to the shooting field and in terms of light intensity as it is perceived from the shooting device when said light source is fully visible to the shooting device; and
   generating said digital light intensity map from the preliminary digital map and the digital image to be corrected, by determining pixels belonging to said light source in the preliminary digital map that are hidden from the shooting device in the digital image to be corrected.

2. The method for correcting a halo according to claim 1, wherein the convolution kernel is a matrix generated from a sum of a one-dimensional function having a constantly decreasing envelope and representative of contributions from kernel scattering phenomena and a two-dimensional function and representative of contributions from a kernel diffraction figure.

3. The method for correcting a halo according to claim 1, wherein the convolution kernel is a matrix generated from a constantly decreasing isotropic function.

4. The method for correcting a halo according to claim 3, wherein that convolution kernel is generated by means of the following steps:
   acquiring a first and a second digital training image by means of the shooting device, these two images respectively comprising a training light source that is switched off and said training light source that is switched on;
   generating a training light intensity map of the training light source from the first digital training image by assigning a light intensity value to the pixels of this second digital training image comprised in the training light source; and
   calculating the convolution kernel from the two digital training images and the light intensity map.

5. An image capture device for a three-dimensional modeling studio, comprising a plurality of shooting devices functionally connected to a data processing unit, wherein said data processing unit is specially adapted to implement the method for correcting a halo according to claim 1.

6. The method for correcting a halo according to claim 1, wherein the convolution kernel is a matrix generated from a sum of a one-dimensional function having a constantly decreasing envelope and representative of contributions from kernel scattering phenomena and a two-dimensional function and representative of contributions from a kernel diffraction figure.

7. The method for correcting a halo according to claim 1, wherein the convolution kernel is a matrix generated from a constantly decreasing isotropic function.

8. The method for correcting a halo according to claim 1, wherein that convolution kernel is generated by means of the following steps:
   acquiring a first and a second digital training image by means of the shooting device, these two images respectively comprising a training light source that is switched off and said training light source that is switched on;
   generating a training light intensity map of the training light source from the first digital training image by assigning a light intensity value to the pixels of this second digital image comprised in the light source; and
   calculating the convolution kernel from the two digital training images and the light intensity map.

9. A method for correcting a halo in a digital image to be corrected of a scene captured in a three-dimensional modeling studio using photogrammetry by means of a shooting device having a shooting field of the scene, this halo being generated through an interaction of light emitted by a light source with an optic of the shooting device, and manifesting as a lightening of pixels of the digital image to be corrected, said light source forming part of a lighting system of the scene, comprising:

generating a digital light intensity map characterizing said light source in terms of spatial distribution relative to the shooting field and in terms of light intensity as it is perceived from the shooting device during the capture of the image to be corrected, this map forming a first data matrix;

providing a convolution kernel specific to said shooting device, forming a second data matrix;

calculating a convolution product of the first data matrix and the second data matrix to obtain a third data matrix corresponding to a corrective value map of the halo in the digital image to be corrected; and removing the corrective value map from the digital image to be corrected pixel by pixel to obtain a corrected image in which the halo is not present;

wherein that convolution kernel is generated by means of the following steps:

acquiring a first and a second digital training image by means of the shooting device, these two images respectively comprising a training light source that is switched off and said training light source that is switched on;

generating a training light intensity map of the training light source from the first digital training image by assigning a light intensity value to the pixels of this second training digital image comprised in the training light source; and calculating the convolution kernel from the two digital training images and the light intensity map.

* * * * *